United States Patent
Groeneveld et al.

(10) Patent No.: US 8,285,699 B2
(45) Date of Patent: Oct. 9, 2012

(54) GENERATING SEARCH RESULT SUMMARIES

(75) Inventors: Dirk Groeneveld, Bellevue, WA (US); Dmitriy Meyerzon, Bellevue, WA (US); David Mowatt, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/220,929

(22) Filed: Aug. 30, 2011

(65) Prior Publication Data

US 2011/0313992 A1    Dec. 22, 2011

Related U.S. Application Data

(63) Continuation of application No. 12/947,649, filed on Nov. 16, 2010, now Pat. No. 8,032,519, which is a continuation of application No. 12/023,678, filed on Jan. 31, 2008, now Pat. No. 7,853,587.

(51) Int. Cl.
G06F 17/30 (2006.01)

(52) U.S. Cl. .......................................... 707/706

(58) Field of Classification Search .............. 707/5, 6, 707/706; 709/223
See application file for complete search history.

(56) References Cited

U.S. PATENT DOCUMENTS

| | | | |
|---|---|---|---|
| 6,078,914 A | 6/2000 | Redfern | |
| 7,849,081 B1 | 12/2010 | Chang | |
| 7,853,587 B2 | 12/2010 | Groeneveld | |
| 7,856,441 B1 | 12/2010 | Kraft | |
| 2003/0033295 A1 | 2/2003 | Adler | |
| 2004/0059729 A1 | 3/2004 | Krupin | |
| 2005/0114317 A1 | 5/2005 | Bhide | |
| 2005/0149576 A1 | 7/2005 | Marmaros | |
| 2005/0223067 A1 | 10/2005 | Buchheit | |
| 2005/0234880 A1 | 10/2005 | Zeng | |
| 2005/0278314 A1 | 12/2005 | Buchheit | |
| 2006/0007875 A1 | 1/2006 | Andersen | |
| 2006/0026152 A1 | 2/2006 | Zeng | |
| 2006/0041562 A1 | 2/2006 | Paczkowski | |
| 2006/0161542 A1 | 7/2006 | Cucerzan | |
| 2006/0200464 A1 | 9/2006 | Gideoni | |
| 2006/0224582 A1 | 10/2006 | Hogue | |
| 2006/0230035 A1 | 10/2006 | Bailey | |
| 2006/0235843 A1* | 10/2006 | Musgrove et al. ............ 707/6 |
| 2007/0016583 A1 | 1/2007 | Lempel | |
| 2008/0133482 A1 | 6/2008 | Anick | |
| 2008/0140643 A1* | 6/2008 | Ismalon ..................... 707/5 |
| 2009/0119275 A1* | 5/2009 | Chen et al. ................. 707/5 |

OTHER PUBLICATIONS

Ko et al.; "An Effective Snippet Generation Method Using the Pseudo Relevance Feedback Technique" copyright *SIGIR* '07 Proceedings, Jul. 23-27, 2007, 2 pages.
O'Brien et al.; "Predictive Modeling of First-Click Behavior in Web-Search" copyright 2006; 5 pages.
Turpin et al.; "Fast Generation of Result Snippets in Web Search" copyright 2007; 8 pages.
Weiss et al.; "Web Search Results Clustering in Polish: Experimental Evaluation of Carrot" accessed at: http://www.cs.put.poznan.pl/dweiss/site/publications/download/iipwm-dweiss-2003.pdf; accessed on Sep. 18, 2007; 9 pages.

* cited by examiner

*Primary Examiner* — Etienne Leroux
(74) *Attorney, Agent, or Firm* — Merchant & Gould

(57) ABSTRACT

Embodiments are configured to provide a summary of information associated with one or more search results. In an embodiment, a system includes a summary generator that can be configured to provide a summary of information including one or more snippets associated with a search term or search terms. The system includes a ranking component that can be used to rank snippets and the ranked snippets can be used when generating a summary that includes one or more ranked snippets. In one embodiment, the system can be configured to include one or more filters that can be used to filter snippets and the filtered snippets can be used when generating a summary. Other embodiments are available.

20 Claims, 6 Drawing Sheets

GENERATING SEARCH RESULT SUMMARIES

CROSS-REFERENCE TO RELATED APPLICATION

This application is a continuation of U.S. application Ser. No. 12/947,649 filed on Nov. 16, 2010, which is a continuation of a U.S. application Ser. No. 12/023,678 filed on Jan. 31, 2008, entitled Generating Search Result Summaries.

BACKGROUND

Search engines can be used to locate documents and other files using search terms, such as keywords. Search engines can return search results based on some user query. Search results generated by a search engine can include short summaries with the search results. In some cases, a short summary can help a user to decide whether and how a search result relates to an associated query. A summary can include portions of text and a title associated with a search result.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are configured to provide a summary of information associated with a search result. In an embodiment, a system includes a summary generator that can be configured to provide a summary of information including one or more snippets associated with a search term or search terms. The system includes a ranking component that can be used to rank snippets and the ranked snippets can be used when generating a summary that includes one or more ranked snippets. In one embodiment, the system can be configured to include one or more filters that can be used to filter snippets and the filtered snippets can be used when generating a summary.

These and other features and advantages will be apparent from a reading of the following detailed description and a review of the associated drawings. It is to be understood that both the foregoing general description and the following detailed description are explanatory only and are not restrictive of the invention as claimed.

BRIEF DESCRIPTION OF THE DRAWINGS

FIGS. 4A-4B provide an illustrative example of a snippet generation process.

DETAILED DESCRIPTION

Figure 1:
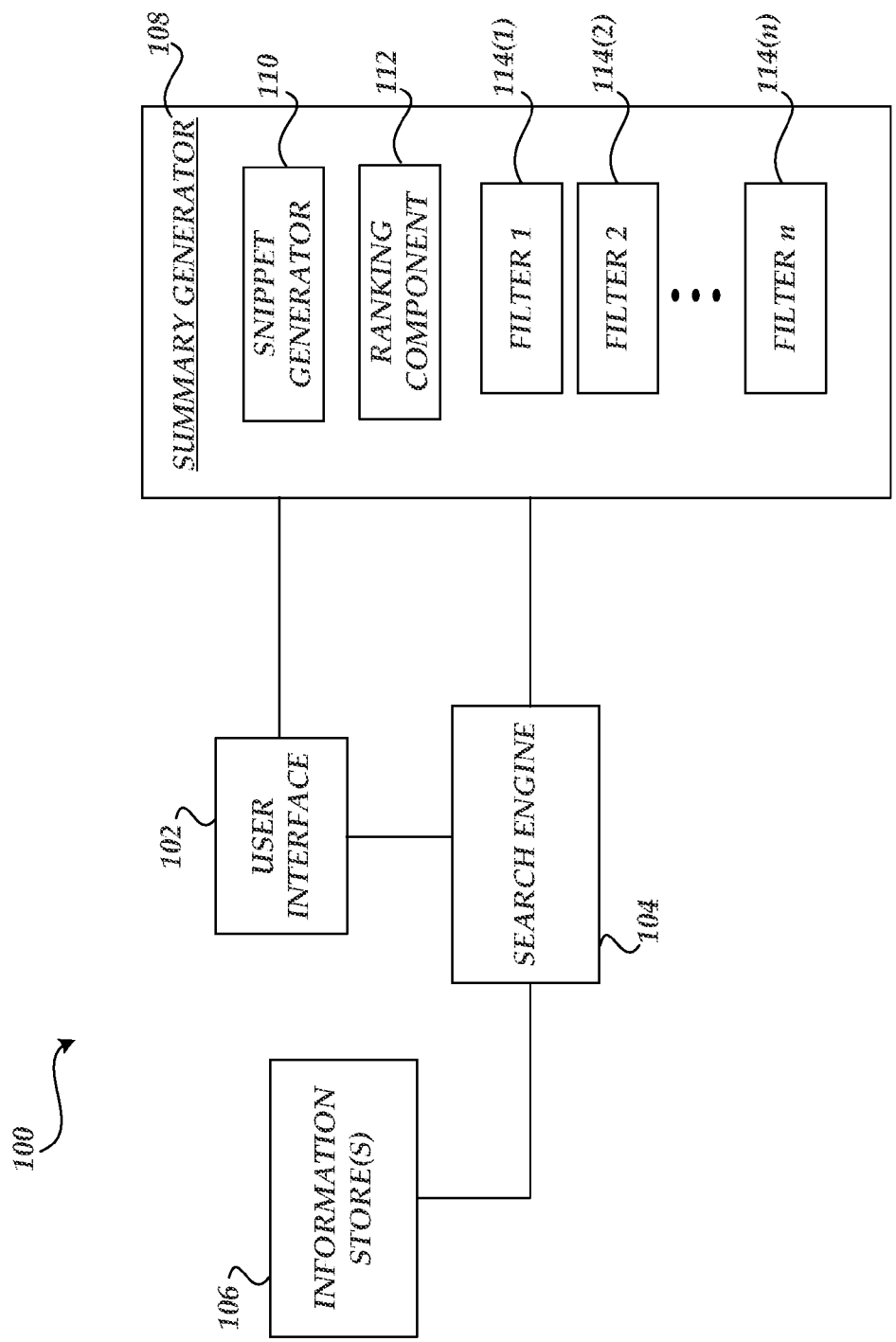
FIG. 1 depicts a block diagram of an example system configured to generate information.

Embodiments are configured to provide a summary of information associated with a search results, including summaries associated with multiple search results. For example, the system can return search results that summarize information which enables a user to quickly identify an intended search result. In an embodiment, a system includes a summary generator that can be configured to provide a summary of information including one or more ranked snippets associated with a search term or search terms. The system also includes a snippet generator that can be used to provide snippets associated with a search term or terms. The system can provide summaries that include a query term or terms with sufficient context such that a user can identify a preferred search result.

In one embodiment, the summary generator includes a ranking component that can be configured to rank snippets, wherein the ranked snippets can be used by the summary generator when generating a summary that includes one or more ranked snippets. The summary generator can also be configured to include one or more filters that can be used to filter snippets, and the summary generator can use the one or more filters when determining which snippets to include in an associated summary.

In another embodiment, a system includes a summary generator application that can be included as part of a computer-readable storage medium. The summary generator application can be used to provide summaries of search results based in part on a user query which includes one or more search terms. For example, a user can input keywords to a search engine and the summary generator application can use the keywords to return summaries of relevant search results which include relevant snippets based in part on a snippet ranking determination. The summary generator application can also use one or more filters in conjunction with a ranking component to provide a summary that includes relevant snippets, including ranked snippets and/or snippets that have not been discarded by a filter.

As described below, embodiments can be configured to generate summaries that include pertinent information while reducing the inclusion of repetitive and/or irrelevant information in the summaries. For example, embodiments can operate to generate summaries of search results which include relevant snippets while reducing repetitive and/or irrelevant information from being included in the snippets. Summaries of search results can be provided by reducing the insertion of snippets that add little or no value to a user who is attempting to identify an applicable search result from the search result summaries.

Embodiments can also be configured to use a ranking component and/or one or more filters to guard against providing repetitive information as part of a search result summary including limiting snippets that contain layout, markup, and uniform resource locators (URLs) for example. In some cases, snippets containing certain information that may not be useful to a user depending on the type of search, such as code, formatting codes, random XML properties, etc., can be filtered and discarded so as not to be included in a summary. For example, snippets can be generated by filtering out document layout information, markup data, URLs, and other information that provides minimal significance to a user who is scanning or otherwise examining a search result summary.

Figure 2:
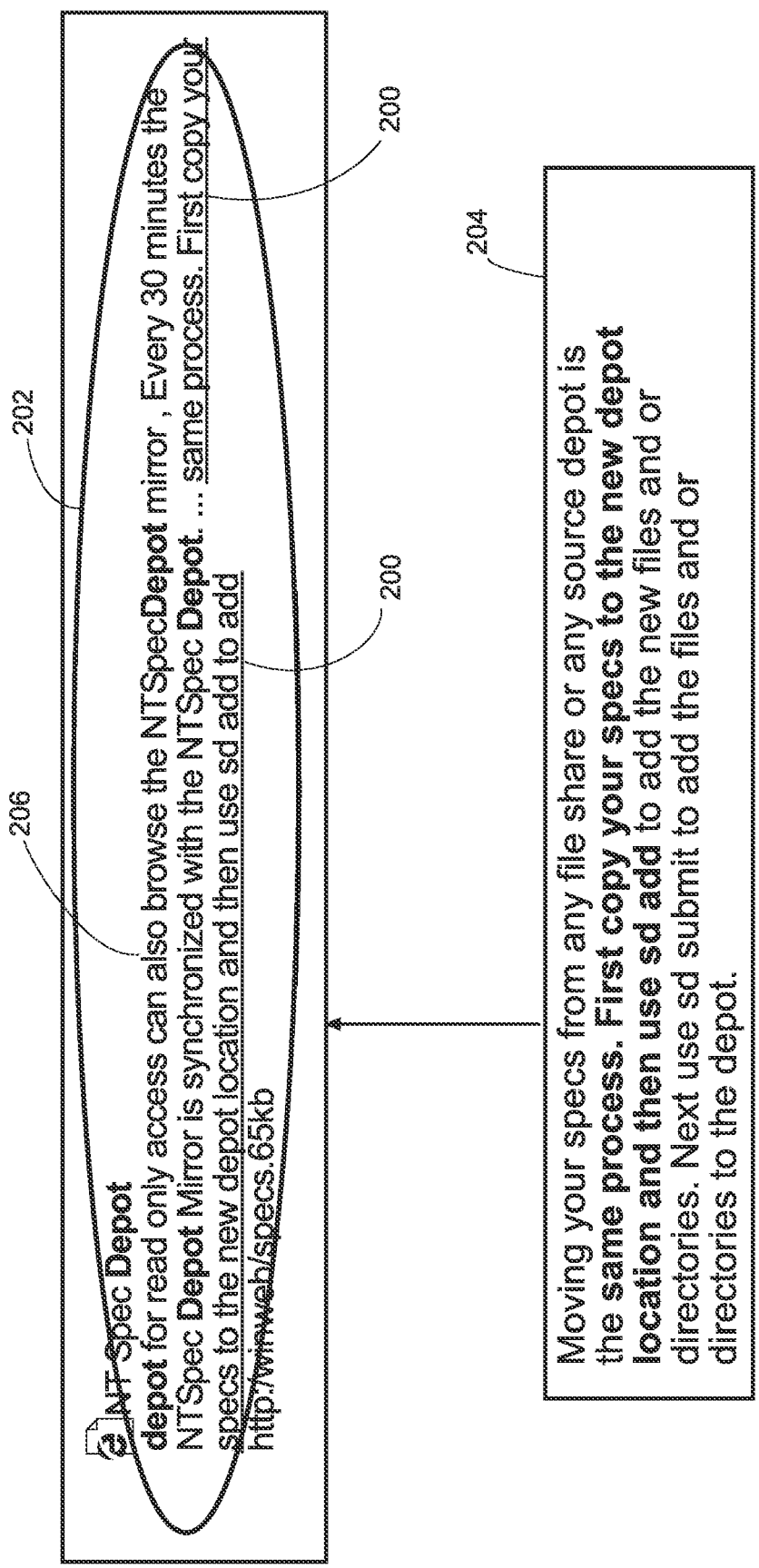
FIG. 2 is an illustrative example of a generated summary.

FIG. 1 is a block diagram of a system 100 according to an embodiment. The system 100 includes functionality to provide a summary of a search result, but the system 100 is not so limited. For example, the system 100 can use a search term input by a user to generate snippets of information that can be included in search result summaries. As used herein, a snippet refers to a component of a summary (see snippet 200 (shown with underline) included in the summary 202 of FIG. 2) and can include a search term or terms (e.g., depot). As shown in FIG. 2, the snippet 200 is associated with a chunk 204 of text. As described below, chunks can be generated from a source, such as a document, file, page, or other information source. As shown in FIG. 2, another snippet 206 generated from a different chunk (not shown) has also been included in the summary 202.

As described below, components of the system 100 can be used to rank and/or filter snippets when generating a summary that is associated with a user query. For example, a query may consist of one or more keywords, phrases, terms, and/or other search items. As an example, components of the system 100 can be configured to provide web-based search engine functionality that can be used to return summaries of search results which include ranked and/or filtered snippets to a user browser based in part on a submitted query. As used herein, a filtered snippet refers to a snippet that has passed through an associated filter and has not been discarded.

As shown in FIG. 1, the system includes a user interface 102, such as a browser, search window, or other interface for example. A user can use the user interface 102 to submit queries to a search engine 104. The search engine 104 includes functionality to perform indexing and searching operations, including locating information associated with one or more information repositories, such as information repository 106. For example, the search engine 104 can operate to use a word, words, a phrase, concept, and other data to locate relevant files, documents, web pages, and other information. The search engine 104 can be used with an operating system (OS), file system, web-based system, host system, application, or other system.

As described briefly above, the search engine 104 includes indexing and searching functionality which can be used for indexing and searching operations. For example, the search engine 104 can use a crawler or similar device to crawl a file system, web-based collection, or other repository when collecting information. The indexing functionality of the search engine 104 can be used to index keywords from document bodies and/or metadata associated with web sites, file servers, and other information repositories. The search engine 104 can be used as part of a local, networked, and/or web-based search engine to return search results associated with local files, remotely networked files, combinations of local and remote files, etc. For example, a local search engine can be used to search local or network-based information repositories and a web-based search engine can be used to search information repositories over the Internet or other web-based system.

As described briefly above, the search engine 104 can use a summary generator 108 to return summaries of search results, including one or more ranked and/or filtered snippets associated with pages, documents, files, and other data structures. In an embodiment, the summary generator 108 can be configured to generate a search result summary based in part on search results provided by the search engine 104 and one or more query terms. The summary generator 108 can be used as part of a local, networked, web-based or other system to generate search result summaries. While the summary generator 108 is shown as a separate component, in alternative embodiments, the functionality of the summary generator 108 can be included as part of the functionality of the search engine 104. Moreover, while a number of components are shown as separate components, one or more of the components can be included with the search engine 104 or can be combined or implemented in different configurations.

As shown in FIG. 1, the summary generator 108 includes a snippet generator 110, a ranking component 112, and a number of filters 114(1)-114(n), where n is an integer. The snippet generator 110 can be used to generate one or more snippets based in part on an associated input. In an embodiment, the snippet generator 110 can use parts of a data structure (e.g., text) and a query term or terms to generate one or more snippets (see snippets 416-424 of FIG. 4B for example). The indexing and searching functionality of the search engine 104 can be used to separate or parse a source (e.g., document, file, page, etc.) into chunks of text (see chunks 402-412 of FIG. 4B for example) that can be used to generate snippets and search result summaries.

In one embodiment, the search engine 104 can be configured to generate chunks of text associated with a source or search result, wherein each chunk of text corresponds to a continuous passage of text associated with the search result. For example, a chunk can be delineated by a paragraph break, sentence break, or some other delimiter used to identify a beginning and/or an end of a data structure. The search engine 104 can be configured to return a set of search results and associated chunks according to some criteria (e.g., return the top ten most relevant results). In another embodiment, the summary generator 108 can communicate directly with one or more information stores to receive or obtain one or more chunks of text and/or other data.

The search engine 104 can also return a title associated with a search result, a description of the search result, a URL, and/or zero or more alternative words for every word in a chunk. In some cases, alternative words may be necessary for languages with compound words (e.g., German), where a compound word can be accompanied by its components in the alternative word list. In another embodiment, the search engine 104 can be configured to generate and store chunks associated with a set of search results to a structured query language (SQL) database.

The snippet generator 110 can be configured to use each chunk to generate one or more associated snippets. The snippet generator 110 operates on each chunk, term by term, looking for a query term or terms. If the snippet generator 110 locates a query term, it can operate to establish a window around the query term. In some cases, a snippet may not be generated from a chunk. For example, a chunk may not include a search term associated with a user query. In other cases, multiple snippets can be generated from a single chunk (see chunk 406 of FIG. 4B for example). In an embodiment, the snippet generator 110 can be configured to locate a query term within a chunk and generate a configurable window around the located query term. Based in part on the configuration of the window, the snippet generator 110 can generate snippets of varying lengths. If more than one query term is within the bounds of the configurable window, the snippet generator 110 can extend the window about the terms.

In one embodiment, the snippet generator 110 can be configured to locate a query term or terms and generate a symmetric window spanning an even number of terms (e.g., words) about the query term or terms. For example, the snippet generator 110 can operate to generate a symmetric window having seven words on each side of a query term or terms (see snippets 418 and 420 of FIG. 4B for example). If there are not enough terms to be included on either side of the window, the snippet generator 110 can truncate the window. If windows overlap, the snippet generator 110 can also operate to combine the windows when generating a snippet as long as the snippet does not exceed a configurable maximum number of terms. In another embodiment, the snippet generator 110 can use a configurable sliding window to generate snippets, wherein each side of the sliding window can include a differing number of terms (e.g., an asymmetric window).

With continuing reference to FIG. 1, the ranking component 112 can be used to rank snippets (e.g., filtered or unfiltered snippets) that are generated by the snippet generator 110 as part of providing a search result summary (such as the search result summary 202 of FIG. 2). For example, the ranking component 112 can use a configurable ranking algorithm and/or one or more ranking features associated with a snippet and/or a query term or terms to rank a snippet as part of a snippet ranking determination. In one embodiment, the ranking component 112 can be configured to rank snippets using a ranking formula which includes a number of ranking features as follows:

$$Q_s = \text{rank} = w_s c_w + p_s c_p + P_s c_p + n_s c_n + r_s c_r \qquad (1)$$

wherein, $w_s$ represents the number of words in a snippet, $p_s$ represents the number of punctuation symbols in the snippet, $P_s$ represents a subset of $p_s$, which corresponds to particular (e.g., generally undesirable punctuation symbols) punctuation symbols in the snippet, $n_s$ represents the number of numbers in the snippet, $r_s$ represents a score of a proximity feature associated with the snippet, and $c_w$, $c_p$, $c_n$ and $c_r$ represent tunable coefficients associated with each ranking feature. For example, values of 1.0, −1.0, −0.3 and 4.0 can be used when ranking snippets.

In an embodiment, the proximity feature score can be used to analyze aspects of a snippet according to a number of associated spans. A snippet can be separated into spans that contain a query term or terms as the term or terms appear in the associated snippet. A span can be defined by a query term or terms, including a sequence of query terms in the proper order. A span can also include other terms between the query terms if the query terms are in the proper order. If a subsequent query term comes before a preceding term in a snippet, associated spans can be defined to contain the respective query terms. In one embodiment, the score of a span can be calculated according to the following formula:

$$\text{score of a span} = f \times 2^{2t-l} \qquad (2)$$

wherein, f is defined as a tunable proximity factor, t is defined as the number of query terms in the span, and l is the number of terms in the span.

As shown in the formula (2) the score decreases when there are additional terms between query terms within a span. Thus, a higher score results when fewer or no terms are interspersed between query terms. The score of a span can be determined using different formulas according to a desired implementation.

The proximity feature $r_s$ can be defined as the sum of the scores of the spans of an associated snippet. The ranking component 112 can operate to identify spans of the snippets which can be scored using the formula (2) above. In one embodiment, the ranking component 112 can operate to identify and quantify separate spans if there are more than a given number of terms (e.g., three words) between query terms.

As an illustrative example, assume that a user enters the query terms "office server" into a search window. Based on the query terms "office server", the snippet generator 110 generates the following snippet:

"The server at the office was down, so John installed Microsoft Office SharePoint Server 2007. Office Server solved his problem."

The italicized words represent spans that the ranking component 112 has identified for use in scoring. The ranking component 112 identifies and defines "server" as the first span since the term "server" is the first query term identified in the snippet. The ranking component 112 next identifies and defines "office" as the second span since it identified another occurrence of office before identifying the second query term "server". The ranking component 112 identifies and defines the third span because it once again identified office and begins a new span (the third). The third span ends with the identified query term "server" and the ranking component 112 once again begins looking for the query terms "office" or "server". The ranking component 112 continues to analyze each snippet to identify and define associated spans.

For the above example, the snippet contains 4 spans: the word "server" defines the first span; the word "office" defines the second span; the phrase "Office SharePoint Server" defines the third span; and, the phrase "Office Server" defines the fourth span. Using the formula (2) and the associated terms: t=1 and l=1, for the first and second spans; t=2 and l=3 for the third span; and, t=2 and l=2 for the fourth span. Using the formula above (and assuming f=1), the score of the first span is equal to 4, the score of the second span is equal to 4, the score of the third span is equal to 2, and the score of the fourth span is equal to 4. Correspondingly, the score of the proximity feature for the example snippet is (4+4+2+4) 14.

As shown in FIG. 1, the summary generator 108 also includes a number of filters 114(1)-114(n). The summary generator 108 can use one or more of the number of filters 114(1)-114(n) to filter snippets (e.g., ranked and unranked snippets) that are generated by the snippet generator 110 when providing a search result summary. Each filter can be configured to include a desirable filtering functionality to filter snippets that provide little additional value (e.g., snippets containing duplicative or redundant information) to a user who is scanning a search result summary. The filters 114(1)-114(n) can be configured such that snippets either pass through a filter (i.e. filtered snippets) or are discarded.

Each filter can also include an algorithm or functionality to assess a snippet according to a defined criterion. In some cases, the summary generator 108 can optionally use no filter or one or more of the filters 114(1)-114(n) in combination with the ranking algorithm (1) or a different ranking algorithm to filter snippets when providing a search result summary. The summary generator 108 can use ranked snippets and/or filtered snippets having passed through one or more filters when generating a search result summary which can be presented to a user for quick and efficient scanning purposes.

Figure 3:
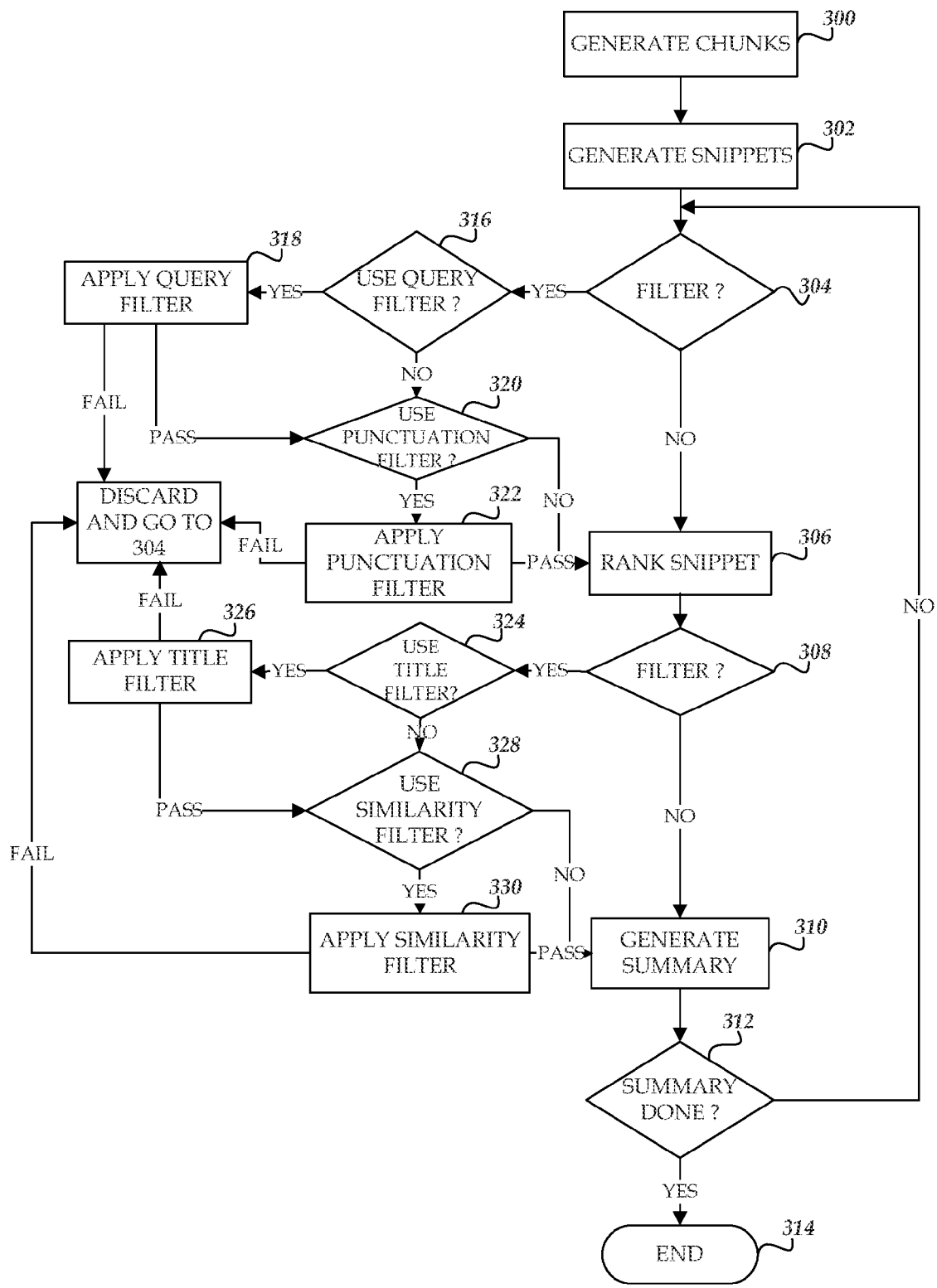
FIG. 3 is flow diagram depicting an example of a summary generation process.

In an embodiment, the summary generator 108 includes four filters: a query filter, a punctuation filter, a title filter, and a similarity filter (see FIG. 3). Each filter can be configured to perform certain filtering functions. The query filter can be configured to eliminate snippets that contain too many query terms and not enough non-query terms. Since the user knows the query terms used for the query, a snippet that consists almost entirely of query words is not very helpful. In one embodiment, the query filter can be configured to discard a snippet if 100% of the words in the snippet are query words. In another embodiment, the query filter can be further configured to discard a snippet if the snippet has more than four words and more than 75% of the words are query words. The query filter is relatively inexpensive to apply since the number of query terms can be quantified when a snippet is first generated.

The punctuation filter can be configured to discard snippets which include excessive punctuation symbols. The punctuation filter can be used to filter layout elements, markup, URLs, or mathematical formulas that may require more significant context than may be practicable to include in a search result summary which may be limited to a maximum number of characters. The punctuation filter can also be used to discard snippets that include punctuation that is not generally used as part of regular prose, such as the punctuation associated with URLs, code, etc. For example, the punctuation filter can be used to discard snippets that include forward and/or backward slashes (e.g., undesirable punctuation). For example, the punctuation filter can operate to filter code samples and mathematical formulas that make little sense without additional context. As one example, the punctuation filter can operate to reject a snippet if it has at least as much punctuation as it has regular words (e.g., URLs having alternating words and punctuation).

The title filter can be used to filter snippets that are substantially similar to the title of a search result, a title of a document for example. Since the title can already be included as a part of a search result, it is of little value to include the title as part of a search result summary. In one embodiment, the title filter can be configured to count how many of the words in the snippet are also contained in the title and discard the snippet if more than a certain percentage of words in the snippet are also included in the title. For example, the title filter can discard a snippet if more than 80% of the words in the snippet also appear in the title.

The similarity filter can be used to ensure that a snippet being examined is not too similar to another snippet that has already been added to the search result summary. The similarity filter can be used to reduce the likelihood of snippets having redundant information from being added to the search result summary. In one embodiment, the similarity filter can be configured to count how many of the words in a snippet under consideration are also contained in a snippet that has already been added to a search result summary. The similarity filter can operate to discard the snippet if more than a certain percentage of words in the snippet are also included in a snippet already included in the search result summary. For example, the similarity filter can discard a snippet under consideration if the snippet shares more than 75% of its words with a snippet that is already part of the search result summary.

In an embodiment, the similarity filter can be configured to maintain an index for terms in the summary as part of a similarity determination. The index can be used to map each term of a snippet under consideration to a list of snippet terms included in a search result summary in determining whether to include the snippet in the search result summary. The similarity filter can operate to determine whether a snippet already exists in the summary that has a certain number of words (e.g., a configurable threshold) that are also included in a snippet under consideration when determining whether to include a new snippet in the search result summary.

For example, assume that the summary generator 108 has generated a search result summary that currently includes two snippets: "He wears no shoeshine . . . he got toe-jam football". The index can be used to identify that the word "he" is included in snippet 1 and snippet 2, the word "shoeshine" is included in snippet 1, the word "football" is included in snippet 2, etc. Continuing the example, assume the new snippet "He got monkey finger" is being examined using the similarity filter for consideration of being inserted into the search result summary. In one embodiment, the similarity filter can operate to create a list of zeros that is as long as the number of snippets already included in the summary. In this example, since the summary currently includes two snippets, the list would be [0, 0].

The similarity filter can use the list to map how many words that a snippet in the summary shares with the new snippet for each snippet in the search result summary by examining each snippet word by word. Using the example above, the first word in the snippet under consideration is "He". The similarity filter examines the index and identifies that the word "he" shows up in snippet 1 and 2. Accordingly, the similarity filter increases the numbers in the list at position 1 and 2. The new list would then include: [1, 1]. The next word in the snippet under consideration is "got". The similarity filter identifies that the word "got" is only included in snippet 2, so it increases the number in the list at position 2. The new list would then include: [1, 2]. The next word is "monkey". The similarity filter identifies that the word "monkey" is not included in the index, so the list remains: [1, 2]. A similar sequence occurs for the last word, "finger", so the final list for this example includes [1, 2].

The similarity filter can then examine the list to identify the maximum of the list to determine whether one or more snippets share a certain number words with the new snippet. In this example, the maximum is 2, which shows that the maximum number of words that the new snippet shares with any other snippet in the summary is 2. To determine whether to include the new snippet in the summary, the similarity filter divides the maximum by the number of words in the snippet. In this case, the length is 4, so $2/4=0.5$. Accordingly, the similarity filter has identified that half of the words in the new snippet are already in the summary.

Based on the similarity filter threshold, the new snippet may or may not be included in the summary. For example, if the threshold was 75%, the new snippet would be added to the summary since 50% is less than the threshold. After including a new snippet in the summary, the similarity filter updates the index with the information of the new snippet, and examines the next snippet. In another embodiment, to reduce processing latency, the similarity filter can operate to re-compute the maximum value of the list when a new term is added. Then, the similarity filter can check whether the new maximum is already high enough to reject the current snippet under examination. If so, the new snippet can be immediately discarded by the similarity filter.

As described above, one or more of the filters can be used when filtering snippets as part of providing a search result summary. Additionally, certain filters can be applied before or after other filters. For example, it may be more efficient to apply one filter, such as the query filter, before applying another filter, such as the similarity filter. In one embodiment, the query and punctuation filters can be applied before the title and similarity filters due in part to the operations involved in the filtering and can also reduce a number of operations for later stages of the summary generation process. Since the system 100 and its components are configurable, one or more of the filters can be applied at a desired stage as part of providing a search result summary, such as one or more pre-ranking and/or one or more post-ranking filters.

As part of the summary generation process, the summary generator 108 can also include starvation handling functionality to handle situations when a summary does not include enough snippets to fill the allotted space for a search result summary. For example, this can occur if a document does not contain the query words, or all the chunks having the query words were filtered out. In one embodiment, the starvation handling functionality includes two stages. In the first stage, if the summary is short of the target character length, words can be selected by scanning the list of chunks in the order they appear in the document and choosing the first chunk that has not been previously selected for use in generating a snippet. This assists in ensuring that snippets that failed to pass through a filter do not go through the process again.

In one embodiment, a chunk will not be considered if the number of associated words in the chunk is less than a given number (e.g., a lower word limit of six words). From each chunk, words can be chosen first to last. If the complete chunk is chosen for a snippet, but the target length has not been reached, the process repeats. Each new snippet has to also pass through one or more of the filters, and/or has to pass a certain quality factor determined by the ranking component 112 to avoid adding snippets that include excessive punctuation or URLs. If the new snippet passes the tests, it is included into the summary. This process repeats until: 1) the summary meets the target length exactly; 2) adding a next snippet by this process would make the summary longer than the target length; 3) adding another word to the snippet that was added last would have made the summary longer than the target length; and/or 4) no chunks remain.

The second stage of starvation handling can be activated if the summary is still completely empty after the first stage. This can occur if chunks are not long enough to be caught by the first stage of the starvation handling process. The process for stage 2 repeats except there is no lower length word limit for the number of words associated with a chunk.

Ultimately, user satisfaction correlates with the operation of the system 100, including a provision of one or more relevant search result summaries. Correspondingly, as described above, components of the system 100 can be configured to efficiently return the most relevant search result summaries which may reduce the amount of time that a user has to spend when investigating search result summaries. Moreover, the components described above can be implemented as part of a networked, distributed, and/or other computer-implemented environment. Components of the system 100 can communicate with one another and other components and systems via a wired, wireless, and/or a combination of communication networks. Various numbers of client computing devices, including desktop computers, laptops, handhelds, or other smart devices can interact with and/or be included as part of the system 100.

In alternative embodiments, the various components can be combined and/or configured according to a desired implementation. For example, the summary generator 108 can be included with the search engine 104. As further example, the filters and/or ranking component can be configured as separate components or included as part of the search engine 104 or some other component. Components can also be implemented in hardware, software, or a combination thereof Accordingly, while certain embodiments include software implementations, they are not so limited and they encompass hardware, or mixed hardware/software solutions. Other embodiments and configurations are available.

Figure 4B:
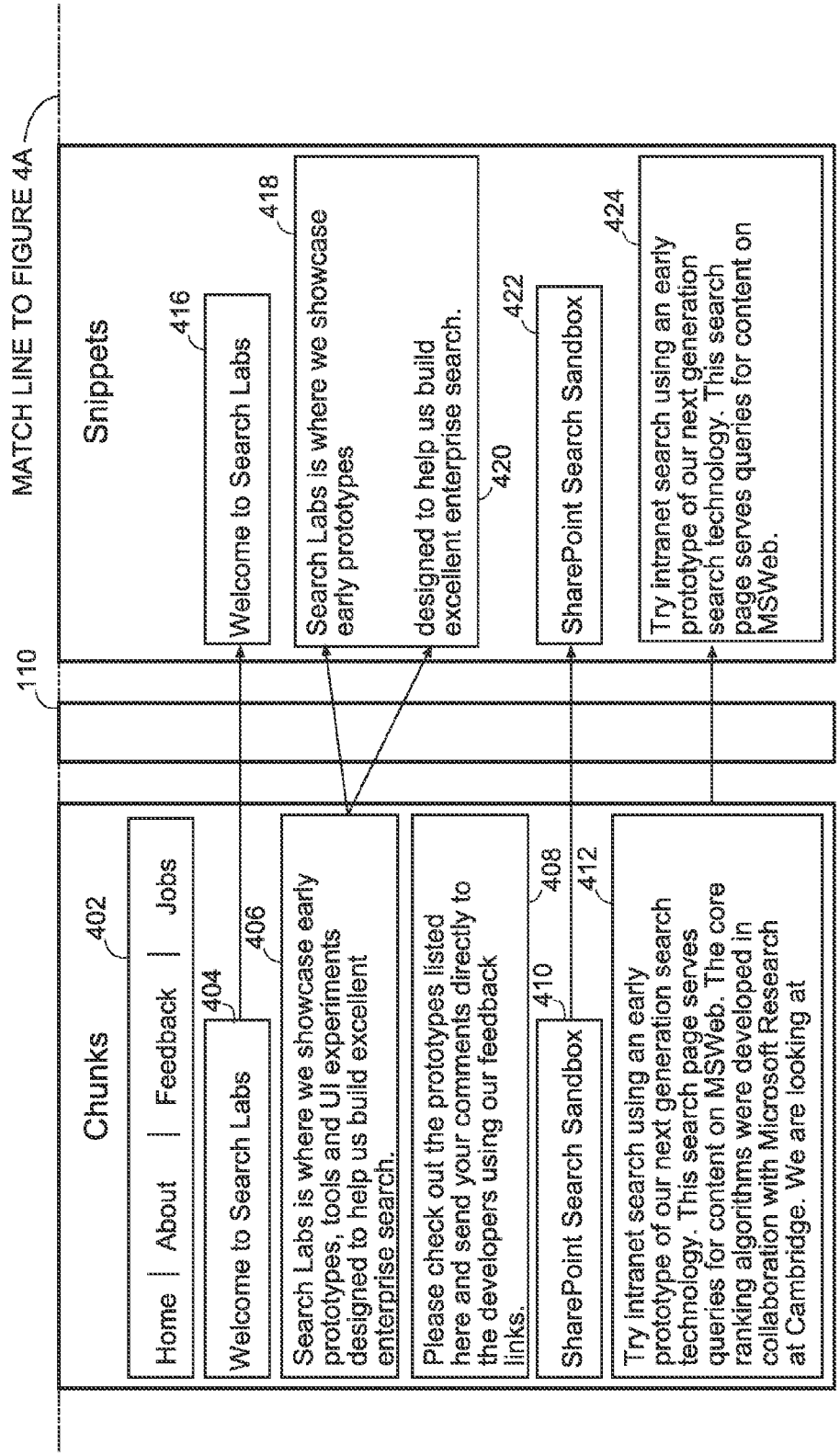

FIG. 3 is a flow diagram illustrating a process of providing a search result summary including a number of snippets based in part on a user query, in accordance with an embodiment. Components of FIG. 1 are used in the description of FIG. 3, but the embodiment is not so limited. FIGS. 4A-4B illustrate an example of snippet generation using the snippet generator 110 and are also referred to in the description of the flow of FIG. 3. At 300, the search engine 104 uses its indexing functionality to parse a source, such as a document, web page, file, etc. into a number of chunks. As shown in FIGS. 4A-4B, the search engine 104 has parsed the document 400 into a number of chunks 402-412. At query time, the search engine 104 receives data associated with a user query, such as one or more query terms 414 shown in FIG. 4B.

At 302, the snippet generator 110 operates to generate one or more snippets based in part on one or more of the chunks and/or query data. For example, a user using a web-based browser can submit a text string consisting of one or more search terms which defines the query data. As shown in FIG. 4B, the snippet generator 110 has generated a number of snippets 416-424 using the query term ("search") and a symmetric window with a span of seven words on each side of the window from the chunks 402-412. More specifically, the snippet generator 110 has generated snippet 416 from chunk 404.

The snippet generator 110 has generated two snippets (snippet 418 and snippet 420) from chunk 406 due to the size of the window (i.e. seven words from the query term "search"). The snippet generator 110 has also generated snippets 422 and 424 from chunks 410 and 412, respectively. As shown in FIG. 4B, the snippet generator 110 did not generate a snippet from either chunk 402 or 408 since these chunks do not contain the query term. However, the chunks 402 and 408 could be used at a subsequent time if starvation handling functionality is initiated. As described below, the summary generator 108 can use the generated snippets 416-424 to create a search result summary, wherein the search result summary can include one or more ranked snippets and/or one or more filtered snippets that have passed through one or more filters.

As described above, the summary generator 108 can be configured to employ one or more filters 114(1)-114(n) in conjunction with the ranking component 112. However, the summary generator 108 can also be configured employ the ranking component 112 without using one or more of the filters 114(1)-114(n). In such a configuration, the summary generator 108 can use ranked snippets to complete the search result summary according to the allowed number of characters in the search result summary. For example, the summary generator 108 can select higher ranked snippets before lower ranked snippets when creating the search result summary. At 304, the summary generator 108 determines if one or more a pre-ranking filters should be used based in part on the configuration of the summary generator 108. If the summary generator 108 is not configured to employ a pre-ranking filter, the flow proceeds to 306 and the ranking component 112 can be used to rank the snippets, one by one, generated from the chunks at 302. In one embodiment, the ranking component 112 can rank snippets in a descending order from high to low ranked snippets using the equation (1).

At 308, the summary generator 108 determines if one or more a post-ranking filters should be used based in part on the configuration of the summary generator 108. If the summary generator 108 is not configured to employ a post-ranking filter, the flow proceeds to 310 and the summary generator 108 creates or generates a search result summary using one or more ranked snippets. As described above, the summary generator 108 can use the ranked snippets in a ranked order until reaching a character limitation (e.g., 300 characters) associated with the search result summary. For example, the summary generator 108 can insert the highest ranked snippet into the search result summary, followed by the next highest ranked snippet, and so on. If the search result summary character limitation has been reached or if there are no remaining snippets at 312, the flow ends at 314.

If the summary generator 108 is configured to employ a pre-ranking filter, the flow proceeds to 316, and the summary generator 108 checks the configuration to determine if a query filter should be used to filter the current snippet under consideration for insertion into the search result summary. If the summary generator 108 is not configured to employ a query filter, the flow proceeds to 320 and the summary generator 108 checks the configuration to determine if a punctuation filter should be employed as described below. If the summary generator 108 is configured to employ a query filter, the flow proceeds to 318 and the query filter is applied to the current snippet under consideration. If the current snippet does not pass through the query filter, the snippet is discarded, the flow returns to 304, and the summary generator 108 moves on to the next snippet.

However, if the current snippet passes the query filter, the flow proceeds to 320 and the summary generator 108 checks the configuration to determine if a punctuation filter should be used to filter the current snippet under consideration. If the summary generator 108 is not configured to employ a punctuation filter, the flow proceeds to 306 and the ranking component 112 is used to rank the current snippet. If the summary generator 108 is configured to employ a punctuation filter, the flow proceeds to 322 and the punctuation filter is applied to the current snippet under consideration. If the current snippet does not pass through the punctuation filter, the snippet is discarded, the flow returns to 304, and the summary generator 108 moves on to the next snippet. If the current snippet passes the punctuation filter, the flow proceeds to 306 and the current snippet is ranked using the ranking component 112.

If the summary generator 108 is configured to employ a post-ranking filter at 308, the flow proceeds to 324 and the summary generator 108 checks the configuration to determine if a title filter should be used to filter the current snippet (having passed through one or more pre-filters and now ranked). If the summary generator 108 is not configured to employ a title filter, the flow proceeds to 328 and the summary generator 108 checks the configuration to determine if a similarity filter should be employed as described below. If the summary generator 108 is configured to employ a title filter, the flow proceeds to 326 and the title filter is applied to the current snippet under consideration. If the current snippet does not pass through the title filter, the snippet is discarded, the flow returns to 304 and the summary generator 108 moves on to the next snippet. If the current snippet passes the title filter, the flow proceeds to 328 and the summary generator 108 checks the configuration to determine if a similarity filter should be employed.

If the summary generator 108 is not configured to employ a similarity filter, the flow proceeds to 310 and the current snippet is added to the search result summary. If the summary generator 108 is configured to employ a similarity filter, the flow proceeds to 330 and the similarity filter is applied to the current snippet under consideration. If the current snippet does not pass through the similarity filter, the snippet is discarded, the flow returns to 304, and the summary generator 108 moves on to the next snippet. If the current snippet passes the similarity filter, the flow proceeds to 310 and the current snippet is added to the search result summary. If the search result summary character limitation has been reached or if there are no remaining snippets at 312, the flow ends at 314.

Otherwise, the flow returns to 304 and the summary generator 108 selects the next snippet for consideration. As described above, the summary generator 108 can be configured to use a number of filters, including one or more pre-ranking and/or one or more post-ranking filters when determining whether to include a snippet in a search result summary. The summary generator 108 can also be configured to not use a filter or can use filters having differing functionalities and configurations. As described above, the filters can be used to ensure that a summary includes snippets that a user can efficiently scan when considering search results. While a certain order and number of operations is described with respect to FIG. 3, the order and number of operations can be changed according to a desired implementation. Other embodiments are available.

Exemplary Operating Environment

Figure 5:
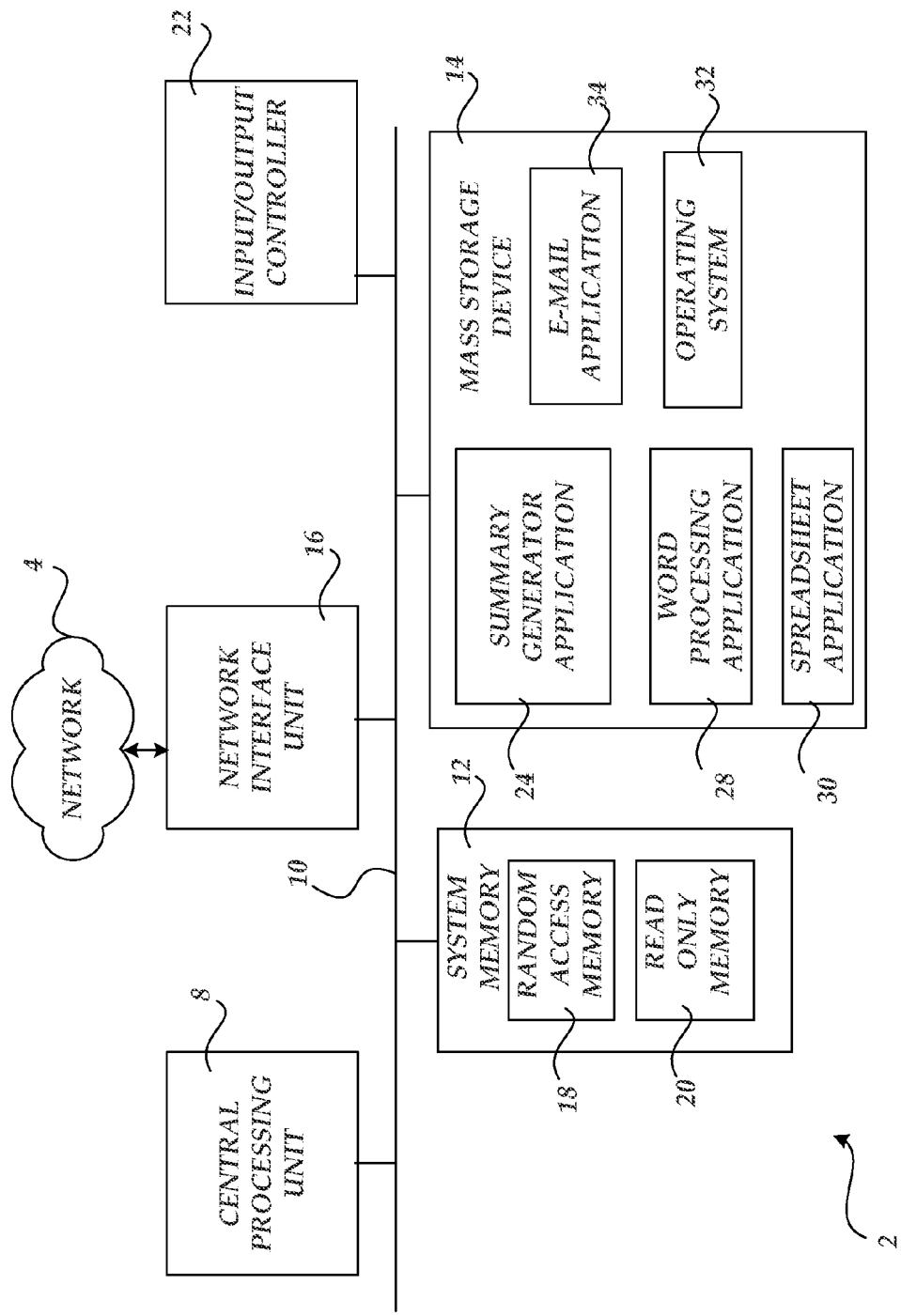
FIG. 5 is a block diagram illustrating a computing environment for implementation of various embodiments described herein.

Referring now to FIG. 5, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 5, an illustrative operating environment for embodiments of the invention will be described. As shown in FIG. 5, computer 2 comprises a general purpose desktop, laptop, handheld, or other type of computer capable of executing one or more application programs. The computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20. The computer 2 further includes a mass storage device 14 for storing an operating system 32, application programs, and other program modules.

The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 4, such as a local network, the Internet, etc. for example. The computer 2 may connect to the network 4 through a network interface unit 16 connected to the bus 10. It should be appreciated that the network interface unit 16 may also be utilized to connect to other types of networks and remote computing systems. The computer 2 may also include an input/output controller 22 for receiving and processing input from a number of other devices, including a keyboard, mouse, etc. (not shown). Similarly, an input/output controller 22 may provide output to a display screen, a printer, or other type of output device.

As mentioned briefly above, a number of program modules and data files may be stored in the mass storage device 14 and RAM 18 of the computer 2, including an operating system 32 suitable for controlling the operation of a networked personal computer, such as the WINDOWS operating systems from MICROSOFT CORPORATION of Redmond, Wash. The mass storage device 14 and RAM 18 may also store one or more program modules. In particular, the mass storage device 14 and the RAM 18 may store application programs, such as a summary generator application 24, word processing application 28, a spreadsheet application 30, e-mail application 34, drawing application, etc.

It should be appreciated that various embodiments of the present invention can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A search engine comprising:
a ranking function used in part to rank snippets based in part on a number of ranking coefficients, a number of words in each snippet, one or more of a number of punctuation symbols and numbers in each snippet, and a score of a proximity feature associated with each snippet, the proximity feature being associated with a snippet span to provide a summary based in part on output of the ranking function, wherein the search engine uses the ranking function to rank the snippets using a first ranking coefficient with the number of words in each snippet, a second ranking coefficient with the number of punctuation symbols in each snippet, a third ranking coefficient with the number of numbers in each snippet, and a fourth ranking coefficient with the score of the proximity feature associated with each snippet.

2. The search engine of claim 1, further configured to search one or more of local and networked information repositories.

3. The search engine of claim 1, further configured to search web-based information repositories.

4. The search engine of claim 1, further configured to use the ranking function to rank each snippet using one or more ranking features including one or more of a first feature associated with the number of words in each snippet, a second feature associated with the number of punctuation symbols in each snippet, a third feature associated with the number of numbers in each snippet, and a fourth feature associated with the score of the proximity feature.

5. The search engine of claim 4, further configured to provide the score of the proximity feature according to the snippet span generated using a number of query terms in each span and number of terms in each span.

6. The search engine of claim 4, further configured to calculate the score of a span for the proximity feature based in part on one or more of a tunable proximity factor, a number of query terms in the span, and a number of terms in the span.

7. The search engine of claim 1, further comprising one of a pre-ranking filter and a post-ranking filter to filter snippets.

8. The search engine of claim 1, further comprising a pre-ranking filter including one of a query filter and a punctuation filter.

9. The search engine of claim 1, further comprising a post-ranking filter including one of a title filter and a similarity filter.

10. The search engine of claim 1, further comprising one or more of a query filter, a punctuation filter, a title filter, and a similarity filter.

11. The search engine of claim 1, further comprising one or more of a query filter to filter snippets based in part on included query terms, a punctuation filter to filter snippets based in part on a number and type of punctuation symbols, and a similarity filter to generate an index associated with the snippets including determining whether to discard certain snippets based in part on an examination of the index.

12. The search engine of claim 1, further configured to parse a source into chunks of text in part to generate snippets and search result summaries.

13. A device comprising at least one processor, memory, and a ranking component used in part to display summary information that uses a ranking determination to rank snippets based in part on a number of ranking coefficients, a number of words in each snippet, one or more of a number of punctuation symbols and numbers in each snippet, and a score of a proximity feature associated with each snippet and a snippet span, wherein the device uses a ranking function to rank the snippets using a first ranking coefficient with the number of words in each snippet, a second ranking coefficient with the number of punctuation symbols in each snippet, a third ranking coefficient with the number of numbers in each snippet, and a fourth ranking coefficient with the score of the proximity feature associated with each snippet.

14. The device of claim 13, further configured to display one or more ranked snippets associated with one or more pages, documents, files, and other data structures.

15. The device of claim 13, including a snippet generator a configurable window associated with a query term.

16. The device of claim 13, further comprising one or more pre-ranking filters and post-ranking filters.

17. The device of claim 13, further comprising a snippet generator that operates on each chunk to identify one or more query terms in part to generate one or more snippets.

18. A user interface comprising a search interface configured in part to enable query input and display results based in part on the use of a ranking component to provide a number of generated snippets based in part on a ranking formula to rank each generated snippet based in part on a number of ranking coefficients, a number of words in each snippet, one or more of a number of punctuation symbols and numbers in each snippet, and a score of a proximity feature associated with each snippet, wherein the ranking component uses the ranking formula to rank the snippets using a first ranking coefficient with the number of words in each snippet, a second ranking coefficient with the number of punctuation symbols in each snippet, a third ranking coefficient with the number of numbers in each snippet, and a fourth ranking coefficient with the score of the proximity feature associated with each snippet.

19. The user interface of claim 18 comprising a browser interface.

20. The user interface of claim 18 configured as part of an operating system.

* * * * *